(12) United States Patent
Marin et al.

(10) Patent No.: US 9,527,606 B2
(45) Date of Patent: Dec. 27, 2016

(54) TOOL TO HOLD SEVERAL MOUNTING CLAMPS SIMULTANEOUSLY AGAINST AN AIRCRAFT FUSELAGE FRAME ELEMENT

(71) Applicant: Airbus Operations (S.A.S.), Toulouse (FR)

(72) Inventors: Yannick Marin, L'Isle Jourdain (FR); Damien Guilloteau, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 77 days.

(21) Appl. No.: 14/448,779

(22) Filed: Jul. 31, 2014

(65) Prior Publication Data
US 2015/0040369 A1 Feb. 12, 2015

(30) Foreign Application Priority Data
Aug. 1, 2013 (FR) ...................... 13 57672

(51) Int. Cl.
| | |
|---|---|
| B64C 1/00 | (2006.01) |
| B23P 11/00 | (2006.01) |
| B64F 5/00 | (2006.01) |
| B64C 1/06 | (2006.01) |
| B64C 1/12 | (2006.01) |

(52) U.S. Cl.
CPC ............. *B64F 5/0009* (2013.01); *B64C 1/061* (2013.01); *B64C 1/12* (2013.01); *Y10T 29/49826* (2015.01); *Y10T 29/53978* (2015.01)

(58) Field of Classification Search
CPC ... F16B 39/101; Y10S 206/82; Y10S 411/966; Y10S 411/969; Y10S 411/97; B64C 1/12; B64C 1/069; B64C 1/061; B64F 5/0009; Y10T 29/53978
See application file for complete search history.

(56) References Cited

U.S. PATENT DOCUMENTS 2,620,008 A * 12/1952 Mallard ................ F16B 39/101
                                                          206/343
2,680,497 A    6/1954 Miller
(Continued)

FOREIGN PATENT DOCUMENTS

| CA | 2367728 A1 * | 7/2002 | ............. B21J 15/14 |
| CN | 201 496 349 | 6/2010 | |

(Continued)

OTHER PUBLICATIONS

French Search Report for Application No. 1357676 dated May 14, 2014.
(Continued)

*Primary Examiner* — Essama Omgba
(74) *Attorney, Agent, or Firm* — Jenkins, Wilson, Taylor & Hunt, P.A.

(57) ABSTRACT

To reduce the time and cost of manufacture of an aircraft fuselage, a tool for positioning mounting clamps to attach a fuselage frame element onto a fuselage skin and/or onto stiffeners is provided. Accordingly, the tool includes a ramp and several systems for holding clamps in position distributed along the ramp, where each system includes a mobile device for applying pressure to the clamp, together with an adjustment device coupled to the mobile device such that its separation from the ramp is adjustable.

19 Claims, 8 Drawing Sheets

(56) References Cited

U.S. PATENT DOCUMENTS

| | | | |
|---|---|---|---|
| 3,036,521 A | 5/1962 | Owen | |
| 3,165,968 A * | 1/1965 | Anstett | F16B 15/08 206/343 |
| 3,177,915 A * | 4/1965 | La Fleur | F16B 37/048 206/820 |
| 3,241,658 A * | 3/1966 | Anderson | A47B 95/02 16/436 |
| 3,467,417 A * | 9/1969 | Whiteside | F16B 35/06 403/408.1 |
| 3,648,749 A | 3/1972 | Warren | |
| 3,704,507 A * | 12/1972 | Grube | B21D 53/24 206/343 |
| 3,711,931 A * | 1/1973 | Ladouceur | B23P 13/00 206/338 |
| 3,967,528 A * | 7/1976 | Baker | B64D 7/08 411/548 |
| 3,999,659 A * | 12/1976 | Grube | B21D 53/24 206/343 |
| 4,203,204 A * | 5/1980 | Murphy | B21J 15/10 29/281.1 |
| 4,310,132 A | 1/1982 | Robinson et al. | |
| 4,310,964 A * | 1/1982 | Murphy | B21J 15/10 29/281.1 |
| 4,412,820 A | 11/1983 | Brummond et al. | |
| 4,946,386 A | 8/1990 | Kidd et al. | |
| 4,995,146 A * | 2/1991 | Woods | B25B 5/003 269/45 |
| 5,105,515 A * | 4/1992 | Nelson | B25B 5/061 269/910 |
| 5,116,178 A * | 5/1992 | Lerman | F16B 39/20 403/316 |
| 5,142,764 A * | 9/1992 | Whiteside | B21J 15/14 269/32 |
| 5,242,523 A | 9/1993 | Willden | |
| 5,273,426 A | 12/1993 | Dragan | |
| 5,477,596 A * | 12/1995 | Schlosstein | B23B 47/28 29/26 A |
| 5,596,859 A | 1/1997 | Horton et al. | |
| 5,632,583 A | 5/1997 | Schneider et al. | |
| 5,775,514 A * | 7/1998 | Lin | F16B 27/00 206/343 |
| 6,073,326 A * | 6/2000 | Banks | B21J 15/10 227/110 |
| 6,088,897 A * | 7/2000 | Banks | B21J 15/10 227/51 |
| 6,134,940 A * | 10/2000 | Banks | B21J 15/10 29/243.54 |
| 6,141,848 A * | 11/2000 | Yousko | B21J 15/10 227/111 |
| 6,158,666 A * | 12/2000 | Banks | B21J 15/10 105/25 |
| 6,210,084 B1 * | 4/2001 | Banks | B21J 15/10 29/34 B |
| 6,332,299 B1 | 12/2001 | Stewart, III | |
| 6,708,821 B2 * | 3/2004 | Tucker | B25B 23/045 206/345 |
| 6,889,414 B2 * | 5/2005 | Korsedal | B25B 23/00 29/271 |
| 7,735,780 B2 * | 6/2010 | Coles | H02G 3/32 244/132 |
| 8,235,634 B2 * | 8/2012 | Larsen | F16B 27/00 411/112 |
| 8,720,730 B2 | 5/2014 | Bodden | |
| 8,784,028 B2 | 7/2014 | Clark | |
| 8,899,522 B2 | 12/2014 | Vinue Santolalla | |
| 9,088,146 B2 * | 7/2015 | Schnoor | H02G 3/32 |
| 2004/0237281 A1 * | 12/2004 | Korsedal | B25B 23/00 29/525.11 |
| 2007/0246876 A1 * | 10/2007 | Wood | B25B 5/003 269/22 |
| 2008/0128550 A1 | 6/2008 | Roming | |
| 2010/0282937 A1 | 11/2010 | Schnoor et al. | |
| 2010/0295227 A1 | 11/2010 | Hung | |
| 2011/0020091 A1 * | 1/2011 | Larsen | F16B 27/00 411/84 |
| 2011/0042519 A1 | 2/2011 | Tacke | |
| 2012/0011693 A1 | 1/2012 | Amirehteshami et al. | |
| 2014/0031647 A1 | 1/2014 | Lin et al. | |
| 2014/0101923 A1 | 4/2014 | Clark | |
| 2015/0001343 A1 | 1/2015 | Bernadet et al. | |
| 2015/0034763 A1 | 2/2015 | Marin et al. | |
| 2015/0034766 A1 | 2/2015 | Marin et al. | |

FOREIGN PATENT DOCUMENTS

| | | | |
|---|---|---|---|
| DE | 10 2006 051 457 | 5/2008 | |
| DE | 10 2009 056 999 | 6/2011 | |
| EP | 2 565 117 | 3/2013 | |
| FR | 1 345 076 | 12/1963 | |
| FR | 2 489 779 | 3/1982 | |
| FR | 2 507 943 | 12/1982 | |
| FR | 2 977 296 | 1/2013 | |
| GB | 2 494 775 | 3/2013 | |
| GB | 2510170 A * | 7/2014 | F16B 39/101 |
| WO | WO 2010/118448 | 10/2010 | |

OTHER PUBLICATIONS

French Search Report for Application No. 1357764 dated Apr. 4, 2014.

French Search Report for Application No. 1357672 dated Apr. 3, 2014.

Non-Final Office Action for U.S. Appl. No. 14/448,768 dated Aug. 26, 2015.

Non-Final Office Action for U.S. Appl. No. 14/448,766 dated Nov. 12, 2015.

Non-Final Office Action for U.S. Appl. No. 14/448,768 dated Aug. 2, 2016.

Non-Final Office Action for U.S. Appl. No. 14/448,807 dated Mar. 17, 2016.

Final Office Action for U.S. Appl. No. 14/448,768 dated Apr. 22, 2016.

\* cited by examiner

TOOL TO HOLD SEVERAL MOUNTING CLAMPS SIMULTANEOUSLY AGAINST AN AIRCRAFT FUSELAGE FRAME ELEMENT

TECHNICAL FIELD

The present subject matter relates to the field of aircraft fuselages, and in particular to that of the positioning of mounting clamps intended to attach an aircraft fuselage frame element to a fuselage skin, and/or on to stiffeners fitted to the skin of this fuselage.

The subject matter disclosed herein applies in particular but not exclusively to the field of commercial airliners.

BACKGROUND

Aircraft fuselages are designed to withstand the loads caused by pressurisation and the loads transmitted by the engines.

To accomplish this fuselages habitually include circumferential frames, also called "orbital frames", together with an aerodynamic skin, sometimes called a "self-stiffened skin", attached to these circumferential frames and fitted with stiffeners habitually extending longitudinally, which are attached to an inner face of the skin, and which are generally called "stringers".

Stringers can have sections of varied types, for example T-shaped, I-shaped, J-shaped or Ω-shaped sections. In certain known configurations, these circumferential frames have a base plate which is attached directly to the inner face of the self-stiffened skin, in which case the frames have notches where the stringers are to pass. In certain known configurations the stringers are interposed between the circumferential frames and the self-stiffened skin, where the frames then pass above the stringers.

In both cases, and in particular in the latter case, angle brackets, commonly called "clips", are positioned between the stringers, and connect the circumferential frames to the skin and/or to the longitudinal stiffeners.

Nevertheless, the clamps are positioned on the frame and attached one-by-one. This individual treatment of each clamp makes the assembly process expensive, particularly since a very large number of clamps is associated with each fuselage frame. In addition, this phase of manufacture of the fuselage generally requires the presence of many operators inside the fuselage segment in question, due to the large number of mounting clamps. It can consequently prove difficult to accomplish other assembly tasks simultaneously from inside the segment when the operators are installing and attaching these clamps, which constitutes another factor penalising manufacturing times and costs.

There is therefore a requirement to optimise this phase of positioning and attachment of the clamps, in order to limit its impact on the overall cost of manufacture of the fuselage.

SUMMARY

The aim of the subject matter disclosed herein is therefore to provide at least partially a solution to the disadvantages mentioned above, compared with the embodiments of the prior art.

To accomplish this, the object of the subject matter disclosed herein is firstly a tool for positioning mounting clamps intended to attach an aircraft fuselage frame element to an aircraft fuselage skin, and/or onto stiffeners fitted to the skin of this fuselage.

The tool includes a ramp and several systems for holding clamps in position distributed along the ramp, where each position-holding system includes a mobile device for applying pressure to the clamp, together with an adjustment device coupled to the mobile device such that its separation from the ramp is adjustable.

The subject matter disclosed herein breaks with the current technique based on individual treatment of each clamp, since it has a tool capable of holding several clamps simultaneously. Thus, instead of repeating for each clamp an operation to position the clamp followed by an operation to attach it, several clamps can be put in position, and subsequently each can undergo the operation to attach it on to the frame, the skin and/or the stiffeners. This results in a rationalisation of the operations, the benefit of which is a shorter assembly time, and therefore reduced costs. In addition, when held simultaneously the clamps can be attached more simply and more rapidly, reducing the number of operators required to intervene within the fuselage. Other assembly operations can also be conducted simultaneously in the fuselage segment in question, leading to a reduced fuselage manufacturing time and a lower overall manufacturing cost. This advantage is more pronounced still when such an operation to attach clamps is automated, for example using robots.

The subject matter disclosed herein preferentially has one or more optional characteristics described below.

At least several of the position-holding systems are installed such that they can slide on the ramp.

Each mobile pressing device includes a first plate coupled to the adjustment device, one or more contact parts intended to contact the clamp to apply pressure to it, and an offsetting mechanism connecting the contact part(s) to the first plate. The offsetting mechanism (42) is preferentially installed such that it can rotate relative to the contact part(s) and/or relative to the first plate.

The offsetting mechanism includes one or more connecting rods, for example forming a pendular system.

The first plate has a holding portion intended to cooperate with one or more stiffeners of the fuselage. The shape of this holding portion is preferably complementary with that of the stiffener(s) with which it is in contact.

The holding portion of the first plate is designed such that it can slide along its associated stiffeners.

Each position-holding system includes a second plate installed on the ramp and coupled to the adjustment device. The adjustment device preferably includes a rotary control, such as a control bar, with a helical connection with the second plate. In this case, one of the ends of the bar can be threaded, and cooperate with a complementary thread of the second plate, to enable the separation with the first plate to be increased or reduced simply by rotating this control bar. However, any other technique is also possible for the adjustment device, without going beyond the scope of the subject matter disclosed herein.

The second plate has a holding portion intended to cooperate with one or more stiffeners of the fuselage. In this case too, the shape of this holding portion is preferably complementary with that of the stiffener(s) with which it is in contact.

The holding portion of the second plate is also designed such that it can slide along its associated stiffeners.

The tool contains between five and fifteen position-holding systems, intended respectively to hold five to fifteen clamps in position.

Another object of the subject matter disclosed herein is an assembly intended to be placed on a fuselage and partially integrated in it, where the assembly includes a fuselage frame element, at least one tool as described above, and multiple clamps held in position by the tool, against the frame element.

This assembly, which is preferably transportable, can therefore be prepared outside the fuselage, before being partially integrated in it. This frees up space within the fuselage segment in order for other assembly operations to be undertaken inside it, consequently leading to gains in terms of time and overall manufacturing cost. Alternatively, this assembly according to the subject matter disclosed herein can be prepared directly on the site, inside the fuselage segment in question.

The ramp of the tool preferably extends over a length roughly identical to that of the fuselage frame. When several tools are associated with a single frame element, it is the length of the ramps placed end-to-end which is roughly identical to that of the fuselage frame element.

Another object of the subject matter disclosed herein is a method to position clamps to attach a fuselage frame element on to a fuselage skin and/or on to stiffeners fitted to the skin of this fuselage, where the method is implemented using a tool as described above, and including a step intended to move the ramp of the tool along the frame element, followed by a step intended to press the mounting clamps against the frame element, using the position-holding systems on the tool.

The method is preferably implemented when the large frame element is already in position relative to the fuselage skin. Alternatively, as mentioned above, the method can be implemented with the fuselage frame element positioned at a distance from the skin, for example outside the fuselage segment, in order to form an assembly as described above, where this assembly is then intended to be transported towards the fuselage skin.

A final object of the subject matter disclosed herein is a method for attaching a fuselage frame element on to a fuselage skin and/or on to stiffeners fitted to the skin, including:
  implementation of the method for positioning mounting clamps as described above; and
  attachment of the clamps on to the frame element and attachment of the clamps on to the fuselage skin and/or on to stiffeners fitted to the skin, where this step of attachment is preferentially accomplished in automated fashion, for example using robots.

Other advantages and characteristics of the subject matter disclosed herein will appear in the non-restrictive detailed disclosure below.

BRIEF DESCRIPTION OF THE DRAWINGS

This description will be made with reference to the attached drawings, among which.

DETAILED DESCRIPTION

Figure 1:
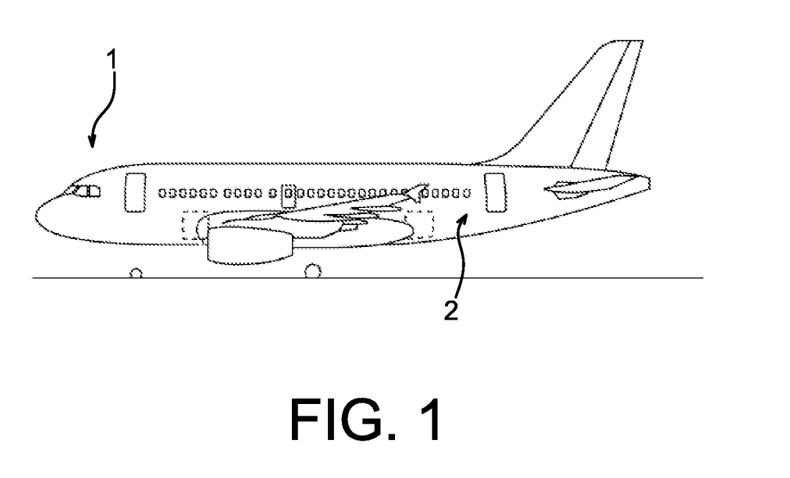
FIG. 1 represents a side view of an aircraft including a fuselage which is to be obtained using a tool according to the subject matter disclosed herein.
Figure 2:
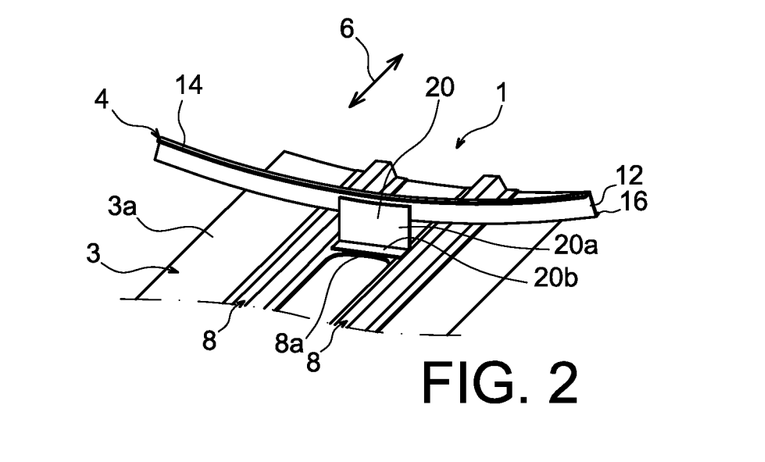
FIG. 2 shows an enlarged view of a portion of the fuselage shown in the previous figure, as seen from inside the aircraft.

With reference firstly to FIG. 1, a commercial airliner 1 is represented having a fuselage 2, a portion of which is shown in more detail in FIG. 2, where this fuselage portion 2 is seen from inside the airliner.

Fuselage 2 conventionally includes a skin 3 the inner face 3a of which supports, in fixed fashion, fuselage frames 4, a single one of which has been represented in FIG. 2. This frame 4 extends over all or a proportion of the periphery of the fuselage, in a transverse plane of the aircraft, i.e. a plane orthogonal to direction 6 corresponding to the airliner's longitudinal and axial direction. Each frame can be produced as a single part, or formed using several frame elements/segments, each one of which forms only a single angular sector of the frame, where these elements are then assembled end-to-end. A frame element typically extends over an angular sector of the order of 30 to 120°. Other angular extents nevertheless remain possible, without going beyond the scope of the subject matter disclosed herein. For the sake of convenience, in the remainder of the description the frame element seen in FIG. 2 and in the following figures will be designated "frame 4". However, it is noted that the other frame elements constituting the frame are of identical or similar design to that which will be presented below, and which is in accordance with the present subject matter.

In addition, fuselage 2 includes multiple longitudinal stringers 8 which are stiffeners, having the form of reinforcing pieces passing between frames 4 and skin 3. All stringers 8 extending in longitudinal direction 6 are attached to inner face 3a of the skin, such as by conventional structure, such as rivets. Stringers 8 have in this case a cross-section with an overall Ω shape, but could have another shape, for example an I, L or J shape, etc.

Each frame 4 includes a core 12 which is the central vertical portion shown in FIG. 2, at the end of which is heel 14, and at the other end of which is footing 16. The core connecting the heel and the footing conventionally resembles the central portion of the stiffener, whilst the footing is intended to be attached to the upper portion of stringers 8. This attachment of footing 16, also called a seat, is made by traditional structure, such as rivets or bolts. For its part, heel 14 constitutes the free end of the stiffener, opposite the end formed by the footing.

In the represented embodiment the section of frame 4 has a general "S" or "Z" shape, with core 12 roughly perpendicular to heel 14 and to footing 16, which respectively form the opposite ends of the frame. However, angles other than 90° can be chosen for certain frames 4, in particular for those frames positioned at the forward point and the aft point of the aircraft. Other general section shapes are however possible, for example I or Ω shapes, etc. Hollow sections are also conceivable, without going beyond the scope of the subject matter disclosed herein.

Fuselage 2 also includes mounting clamps 20, intended to attach fuselage frames 4 to skin 3 and/or to stringers 8 fitted to the skin. Each frame 4 is thus attached using multiple clamps 20 which are distributed along this frame, preferably positioned between stringers 8. In the represented example each mounting clamp 20 includes a vertical portion 20a intended to contact and to be attached to core 12 of the frame, and also a roughly orthogonal portion 20b, which is axially aligned, and intended to contact and to be attached to skin 3. As represented as an example in FIG. 2, it is possible for portion 20b not to be directly supported on the skin, but to be in contact with a connecting portion of stringers 8a which itself is pressed against skin 3. Thus, when portion 20b is attached on to the skin, preferably by rivets or similar structure, it is also securely attached with stringers 8 by the rivets traversing abovementioned connecting portion 8a.

In this embodiment each clamp therefore has a general L shape.

In addition, although this has not been represented, fuselage 2 can include other attachment elements, such as stabilisers connecting the stringers to the fuselage frames.

Figure 3:
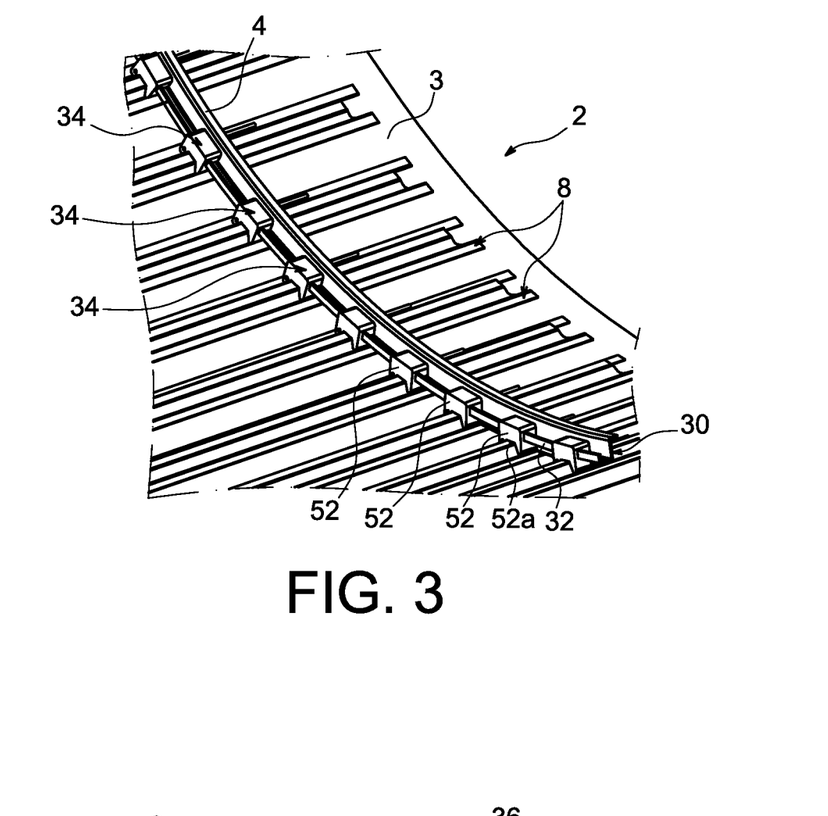
FIGS. 3 to 5 show perspective views of a portion of the fuselage fitted with a tool according to one preferred embodiment of the subject matter disclosed herein, from different viewpoints.
Figure 5:
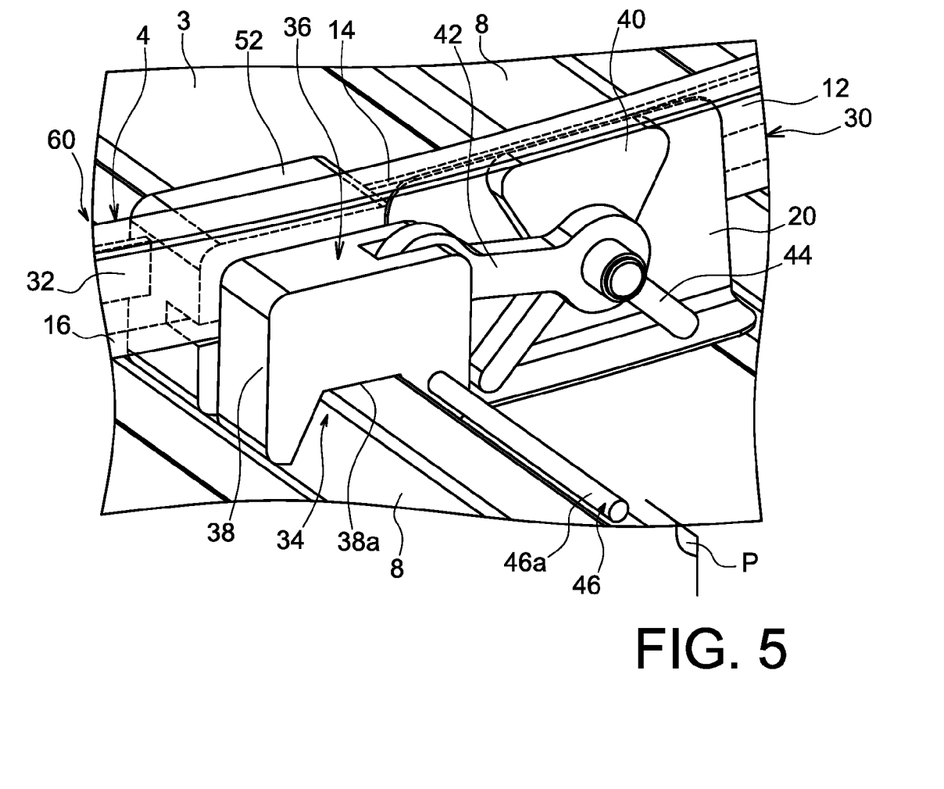
Figure 6:
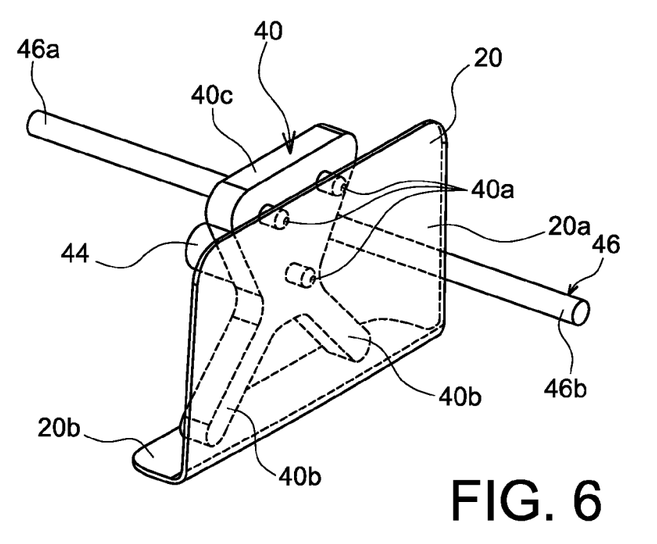
FIG. 6 shows an enlarged perspective view of a portion of the tool shown in the previous figure, cooperating with an mounting clamp.
Figure 7:
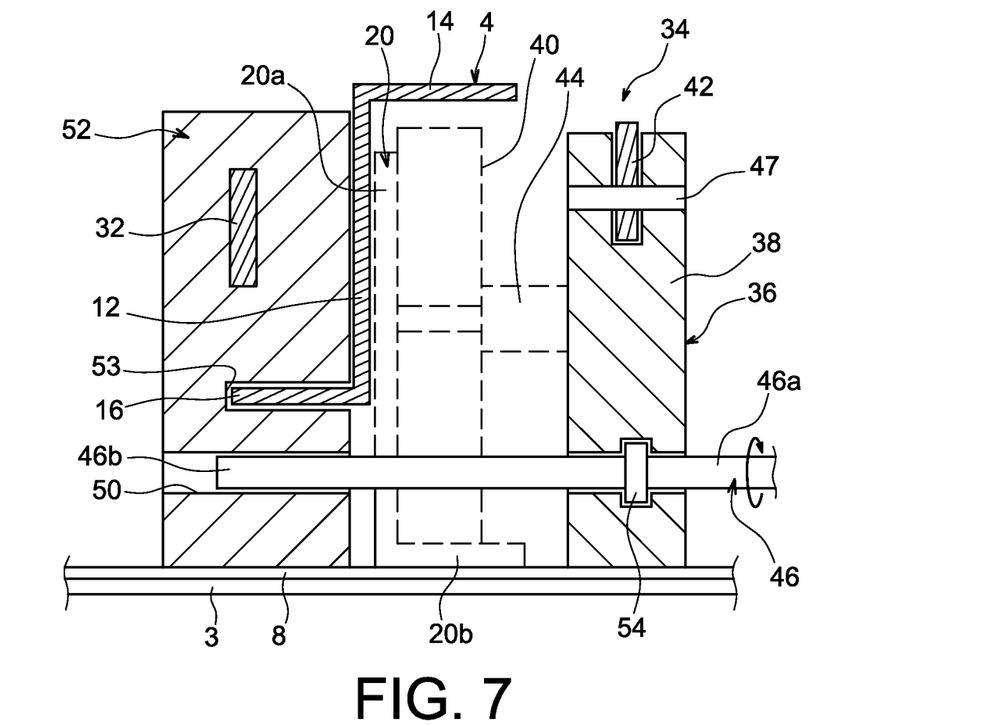
FIG. 7 is a section view of plane P of FIG. 5, passing through the tool's control bar.

With reference, at present, to FIGS. 3 and 7, a tool 30 according to one preferred embodiment of the subject matter disclosed herein will be described. This tool is intended for positioning mounting clamps 20, so as to hold them in position relative to the other elements of the fuselage, before they are attached by rivets or similar structure on to these same other fuselage elements. In these figures, tool 30 is represented in its assembled configuration, in which clamps 20 associated with a single frame 4 are held in position, before being attached. In this regard, it is noted that a single tool 30 can be used to position all the clamps of a single frame 4, or alternatively several tools 30 placed end-to-end can be used to attach elements to this same frame. Whatever the case, each tool 30 can preferentially position five to fifteen clamps simultaneously. In what follows, a solution will be described in which a single tool 30 is associated with each frame 4, which extends for example over a 60° to 120° angular section.

Figure 4:
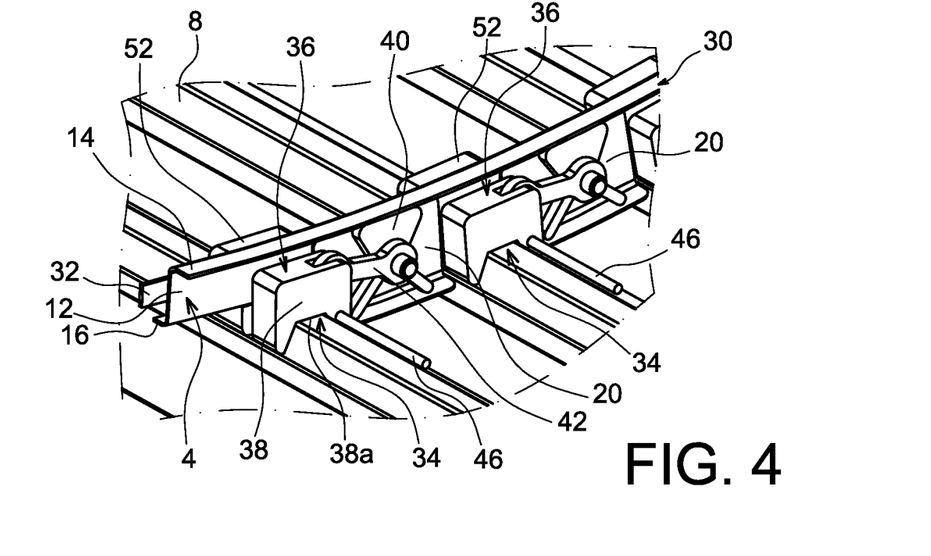

Tool 30 firstly includes a ramp 32 which extends roughly parallel to core 12 of frame 4, i.e. having a roughly identical curvature. Ramp 32 is positioned opposite core 12, in the axial direction, and extends over a length which is roughly identical to that of frame 4. The tool is also preferentially positioned relative to frame 4, taking a frame of reference in relation to the latter, for example by making the ends coincide two-by-two.

The tool also includes several systems 34 for holding the clamps distributed along ramp 32 in position, where each system 34 is intended to hold one of clamps 20 in position.

Each system 34 includes a mobile device 36 for pressing a clamp, located on one side of the frame opposite the side where ramp 32 is located. Each device 36 is fitted with a first plate 38, and with one or more contact parts 40 intended to contact clamp 20 before pressing it. It also includes an offsetting mechanism 42 connecting contact part(s) 40 to first plate 38.

First plate 38 has a generally roughly parallelepipedic shape, with its lower portion partially hollowed out, forming holding portion 38a relative to stringer 8 on which it is supported. More precisely, holding portion 38a is intended to have a section the shape of which is roughly complementary with that of stringer 8 with which it cooperates, in order that it is held in the direction perpendicular to the stringer. In the preferred embodiment which has been represented the section of holding portion 38a therefore has a roughly trapezoid shape to receive the upper portion of the stringer with a global Ω shape. In addition, the proposed complementarity of shapes allows first plate 38 to slide along its associated stringer 8, whilst preventing a relative motion in the direction perpendicular to this stringer.

Contact part 40 preferably allows clamp 20 isostatic to be held in isostatic fashion against core 12 and skin 3, for example using slugs 40a and arms 40b. As an illustrative example, contact part 40 has a base 40c from which extend axially three contact slugs 40a arranged in a triangular fashion and pressing against vertical portion 20a of the clamp, and from which two contact arms 40b extend downwards, pressing against axial portion 20b of the clamp. This same base 40c also has a hinge shaft 44 installed such that it can swivel on the end of a connecting rod 42 forming the offsetting mechanism. Indeed, this connecting rod 42 extends roughly parallel to ramp 32 and core 12, and its opposite end is installed such that it can swivel on first plate 38, also aligned with a shaft 47 aligned perpendicular to ramp 32.

Position-holding system 34 also includes an adjustment device coupled to first plate 38, such that its separation from ramp 32, and therefore its separation from core 12, is adjustable. In this case the adjustment device preferably includes a control bar or rod 46, a gripper end 46a of which is accessible from the side of first plate 38, and an opposite end 46b of which is threaded. This threaded end 46b cooperates with a thread 50 made in a second plate 52 to form a helical connection. The second plate, of roughly identical or similar shape to that of first plate 38, is positioned on the other side of frame 4, i.e. on the side of ramp 32 which traverses this second plate 52 in sliding fashion. To reach this second plate 52 controls bar 46 passes under frame 4, as can best be seen in FIG. 7.

Therefore, by providing for example a shoulder 54 on bar 46 to couple the bar such that it slides with first plate 38, this bar 46 must merely be swivelled from its gripping end to cause the two plates to move closer or further apart. If they are moved closer, when second plate 52 comes into contact with core 12, continued rotation of control bar 46 causes first plate 38 to come closer to core 12 and ramp 32, by moving axially along stringer 8 and bringing with it connecting rod 42 and contact part 40. This latter part 40, following the axial motion of first plate 38, can then apply pressure on clamp 20, to press it against core 12 of frame 4, and by this structure enable this clamp to be held in position, and also be pressed against skin 3 of the fuselage.

As represented in FIG. 7, to allow second plate 52 to be pressed on core 12, this plate can have a groove 53 in which footing 16 of frame 4 can be fitted.

Second plate 52 also has a roughly parallelepipedic general shape, with its lower portion partially hollowed out, forming holding portion 52a relative to stringer 8 on which it is supported. More precisely, holding portion 52a is intended to have a section the shape of which is roughly complementary with that of stringer 8 with which it cooperates, in order that it is held in the direction perpendicular to the stringer. In the preferred embodiment which has been represented the section of holding portion 38a therefore also in this case has a roughly trapezoid shape to receive the upper portion of the stringer with an overall Ω shape. In addition, the proposed complementarity of shapes allows second plate 52 to slide along its associated stringer 8, when the control bar is rotated, whilst preventing a relative motion in the direction perpendicular to this stringer.

Due to their holding portions 38a, 52a, first and second plates 38, 52 can be supported on the head and the two opposite vertically aligned branches of stringer 8, having a Ω-shaped section. Alternatively, a complementarity of shapes may be chosen which does not involve the head of the stringer, but involves the opposite branches (sides) together with the bases of the stringer in direct contact with the skin. In this configuration the mass of the tool is essentially borne by the bases of the stringer and not by its head, consequently reducing the risks of deformation of this stringer 8.

The method for positioning mounting clamps 20 associated with a frame 4 is implemented using tool 30 and includes a step intended to move ramp 32 of the tool along frame 4. Second plates 52 are slid along this ramp such that the separation between them makes each coincide with a stringer head 8. Once the correct positions have been adopted on the ramp, the second plates can possibly be locked in position on this same ramp 32, by appropriate structure (not represented) mounted on the tool and/or on each second plate.

It is noted that ramp 32 could also fulfil a function as a rule, with a scale or similar facilitating the positioning of the second plates and the separation between them. With this rule function the main benefit is that ramp 32 can easily be adapted to different stiffener intervals.

This first step is followed by a step intended to press clamps 20 against core 12 of frame 4, by interposing these clamps between this core 12 and contact parts 40 of mobile devices 36, and then by adjusting control bars 46 to cause them to move axially in the direction of ramp 32 and of core 12.

These operations can be undertaken directly on the fuselage in the course of assembly, with frame 4 already in position relative to skin 3. To accomplish this, tool 30 is firstly brought inside the fuselage segment in question, then positioned on frame 4 before clamps 20 are inserted, and then pressed against core 12 and skin 3. These operations can, if applicable, be undertaken at least partially in automated fashion.

After these operations have been accomplished, an assembly 60 according to the subject matter disclosed herein is obtained, which is then positioned on fuselage 2 before being partially integrated in it, including frame 4, at least one tool 30, together with multiple clamps 20 held in position by the tool against frame 4.

Figure 8A:
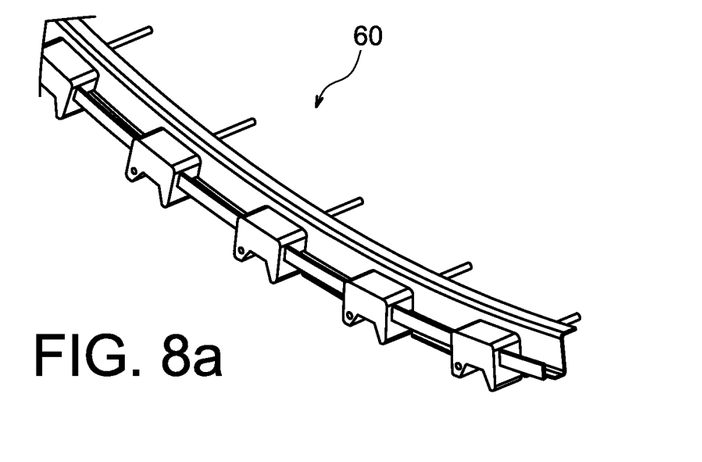
FIGS. 8a and 8b show perspective views of a transportable assembly according to a preferred embodiment of the subject matter disclosed herein, from different viewpoints, where the transportable assembly includes the tool shown in the previous figures.
Figure 8B:
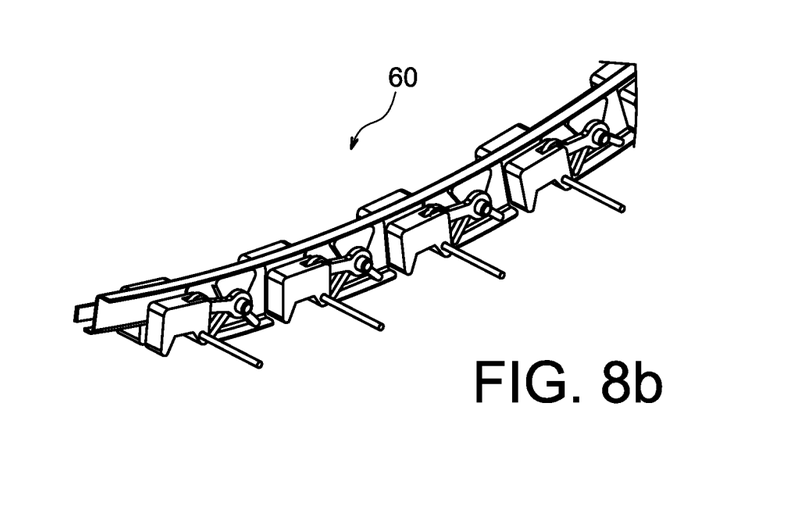

Alternatively, the method of positioning mounting clamps 20 is implemented with frame 4 positioned at a distance from skin 3, preferably outside the segment. A transportable assembly 60 shown in FIGS. 8a, 8b is therefore produced, where this assembly includes frame 4, tool 30 and the multiple clamps 20 held in position by the tool against the core of frame 4. To adjust as appropriate the separation between second plates 52 along ramp 32, a jig can be used to recreate the geometry defined by the skin and the stringers on to which this assembly 60 must be applied before being attached.

By moving this assembly outside the fuselage segment other tasks can be accomplished simultaneously inside this segment. This possibility of accomplishing simultaneous tasks obviously contributes to reducing the time and cost of manufacture of the fuselage.

Figure 9A:
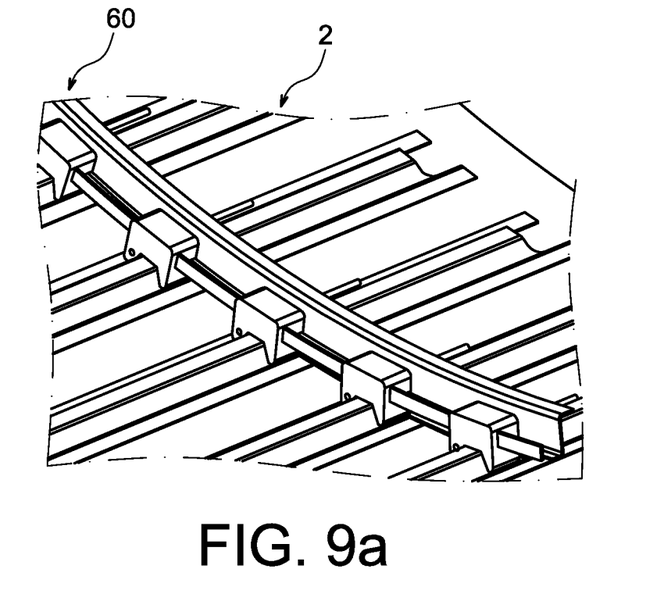
FIGS. 9a and 9b show perspective views of the transportable assembly positioned on the fuselage, from different viewpoints.
Figure 9B:
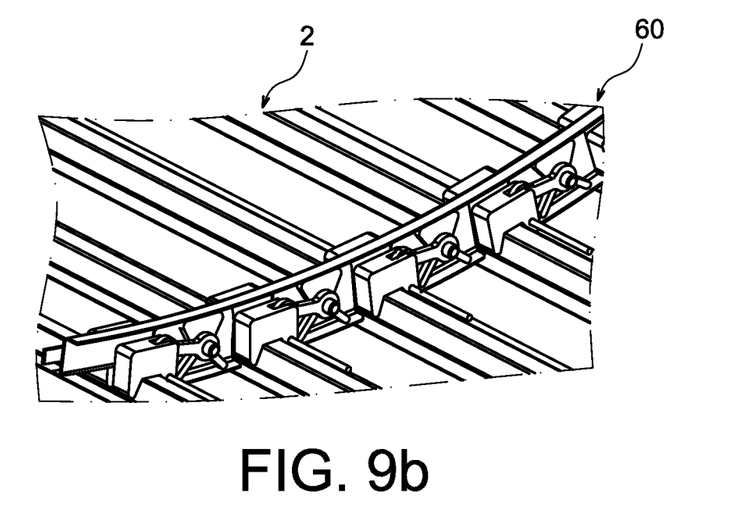
Figure 10:
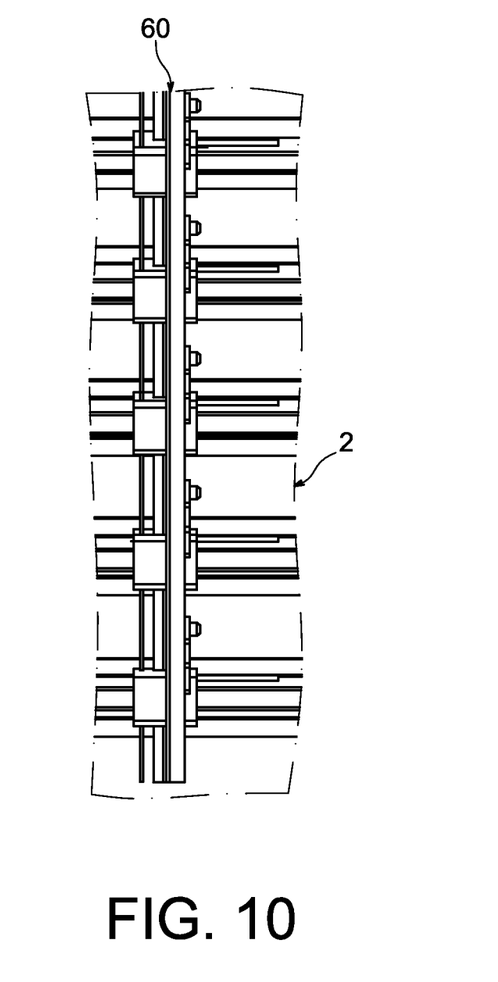
FIG. 10 represents a top view of the assembly shown in FIGS. 9a and 9b.

Transportable assembly 60 is then moved towards the fuselage in the direction of skin 3, so as to place it in a position correctly positioning its frame 4 relative to this same skin 3 and to stringers 8. Assembly 60, correctly positioned on the fuselage in which its frame 4 is to be integrated, is represented in FIGS. 9a, 9b and 10.

Finally, to accomplish a method of attaching a frame 4 on skin 3 and/or on stringers 8, the method of positioning mounting clamps according to one of the two solutions presented above is firstly accomplished.

Clamps 20 are then attached to frame 4 and also on to skin 3 and/or on to stringers 8, preferably by riveting or similar structure. This latter step can be accomplished in automated fashion, for example using robots, which reduces its implementation time. In addition, if the robots chosen are compact, other assembly tasks can be undertaken inside the segment.

In addition, in the second solution mentioned above, in which transportable assembly 60 is produced outside the segment before being integrated in it, the attachment by rivets of clamps 20 to frame 4 can also be undertaken outside the fuselage segment, before assembly 60 is brought into position on skin 3.

After the clamps are attached by rivets or similar structure, tool 30 is disassembled and then reused to attach another frame 4. It is disassembled in reverse order to that of its assembly, i.e. by removing mobile devices 36 by unscrewing each control bar 46, and then by removing the ramp supporting second plates 52.

Figure 11:
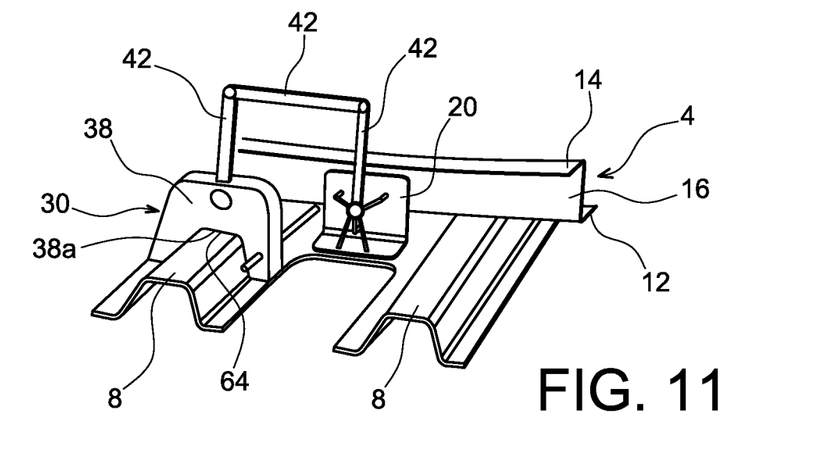
FIG. 11 is a perspective view similar to that of FIG. 5, representing a portion of the tool according to another preferred embodiment of the subject matter disclosed herein.
Figure 12:
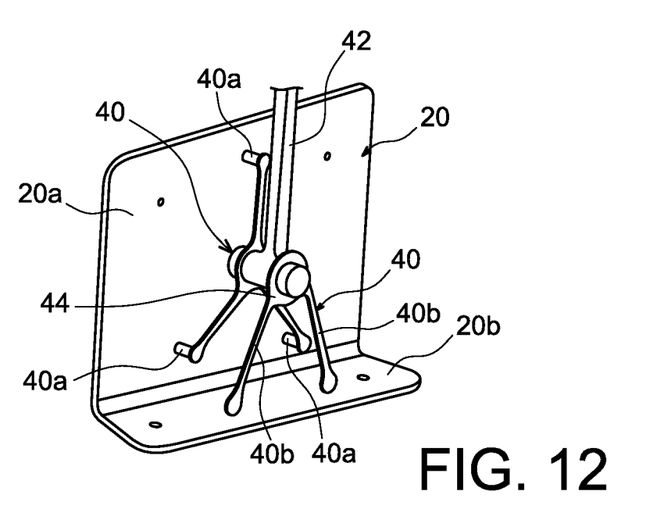
FIG. 12 shows an enlarged perspective view of a portion of the tool shown in the previous figure, cooperating with a mounting clamp.

With reference at present to FIGS. 11 and 12, a tool 30 is represented according to another preferred embodiment of the subject matter disclosed herein, in which the offsetting mechanism no longer has a single connecting rod 42 moving along core 12, but three connecting rods 42 forming a pendular system. The ends of the three connecting rods are indeed connected, and form an inverted U shape which extends beyond heel 14 of frame 4. As a consequence, only a portion of one of the three connecting rods which is vertically aligned is superposed relative to clamp 20, which facilitates access to it for the subsequent operation of installing rivets or similar structure.

In addition, in this configuration, holding portion 38a of first plate 38 is supported against both branches (sides) and both bases of its associated stringer 8, but not in contact with the head of the stringer, and a clearance 64 is maintained to prevent possible risks of collapse of this stringer 8 under the weight of the tool. A comparable arrangement is preferably made between the second plate and associated stringer 8.

In addition, in this embodiment, there are two separate contact parts 40, the first including three arms at the ends of which are contact slugs 40a, and the second including both arms 40b. These two contact parts 40 are connected to shaft 44, which is itself connected to vertical connecting rod 42 which is partially superposed with clamp 20.

Various modifications may naturally be made by those skilled in the art to the subject matter disclosed herein, solely as non-restrictive examples.

The invention claimed is:

1. A tool for positioning mounting clamps used for attaching an aircraft fuselage frame element onto a fuselage skin and/or onto one or more fuselage stiffeners fitted to the fuselage skin, the tool comprising:

a ramp; and
   one or more position-holding systems configured to hold the mounting clamps in position, wherein the one or more position-holding systems are distributed along the ramp, and wherein each of the one or more position-holding systems comprises a mobile device for applying pressure to a respective mounting clamp, together with an adjustment device coupled to the mobile device, such that a separation of the mobile device from the ramp is adjustable.

2. The tool according to claim 1, wherein at least several of the one or more position-holding systems are installed such that the at least several of the one or more position-holding systems are slideable on the ramp.

3. The tool according to claim 1, wherein each of the mobile devices for applying pressure includes a first plate coupled to the adjustment device, one or more contact parts configured to contact the mounting clamps to apply pressure to the respective mounting clamps, together with an offsetting mechanism connecting the one or more contact parts to the first plate, wherein the offsetting mechanism is installed such that the offsetting mechanism rotates relative to the one or more contact parts and/or relative to the first plate.

4. The tool according to claim 3, wherein the offsetting mechanism comprises one or more connecting rods forming a pendular system.

5. The tool according to claim 3, wherein the first plate comprises a holding portion configured to cooperate with the one or more fuselage stiffeners.

6. The tool according to claim 5, wherein the holding portion of the first plate is configured such that the holding portion is configured to slide along an associated stiffener.

7. The tool according to claim 1, wherein each of the one or more position-holding systems comprises a second plate installed on the ramp and coupled to the adjustment device.

8. The tool according to claim 7, wherein the second plate comprises a holding portion configured to cooperate with the one or more fuselage stiffeners.

9. The tool according to claim 8, wherein the holding portion of the second plate is designed such that the holding portion is configured to slide along an associated stiffener.

10. The tool according to claim 1, further comprising between five and fifteen position-holding systems.

11. An assembly for positioning on a fuselage in order to be partially integrated in the fuselage, wherein the assembly comprises a fuselage frame element, at least one tool according to claim 1, together with multiple clamps held in position by the tool, against the fuselage frame element.

12. An assembly according to claim 11, wherein a ramp of the tool extends over a length substantially identical to that of the fuselage frame element.

13. A method for positioning mounting clamps to attach a fuselage frame element onto a fuselage skin and/or onto one or more fuselage stiffeners fitted to the fuselage skin, the method comprising:
using a tool according to claim 1;
moving a ramp of the tool along the fuselage frame element;
pressing the mounting clamps against the fuselage frame element; and
using one or more position-holding systems on the tool.

14. The method according to claim 13, further comprising implementing the tool when the fuselage frame element is already in position relative to the fuselage skin, or with the fuselage frame element positioned at a distance from the fuselage skin, to form an assembly according to claim 11, wherein the assembly is transportable in a direction of the fuselage skin.

15. A method for attaching a fuselage frame element onto a fuselage skin and/or onto one or more fuselage stiffeners fitted on the fuselage skin, the method comprising:
implementing the method for positioning mounting clamps according to claim 13; and
automatically attaching the mounting clamps onto the fuselage frame element and attaching the mounting clamps onto the fuselage skin and/or onto the one or more fuselage stiffeners fitted to the fuselage skin.

16. A tool for positioning mounting clamps used for attaching an aircraft fuselage frame element onto a fuselage skin and/or onto one or more fuselage stiffeners fitted to the fuselage skin, the tool comprising:
a ramp; and
one or more position-holding system configured to hold the mounting clamps in position, wherein the one or more position-holding system is distributed along the ramp, and wherein each of the one or more position-holding system comprises a mobile device for applying pressure to a respective mounting clamp, together with an adjustment device coupled to the mobile device, such that a separation of the mobile device from the ramp is adjustable;
wherein each of the mobile devices for applying pressure includes a first plate coupled to the adjustment device, one or more contact parts configured to contact the mounting clamps to apply pressure to the respective mounting clamps, together with an offsetting mechanism connecting the one or more contact parts to the first plate, wherein the offsetting mechanism is installed such that the offsetting mechanism rotates relative to the one or more contact parts and/or relative to the first plate.

17. The tool according to claim 16, wherein the offsetting mechanism comprises one or more connecting rods forming a pendular system.

18. The tool according to claim 16, wherein the first plate comprises a holding portion configured to cooperate with the one or more fuselage stiffeners.

19. The tool according to claim 18, wherein the holding portion of the first plate is configured such that the holding portion is configured to slide along an associated stiffener.

* * * * *